F. G. PRESTON.
MECHANISM FOR CRANKING AUTOMOBILES AND TO PREVENT INJURY FROM BACK FIRING OF ENGINES.
APPLICATION FILED FEB. 5, 1909.
985,837.
Patented Mar. 7, 1911.
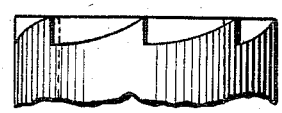
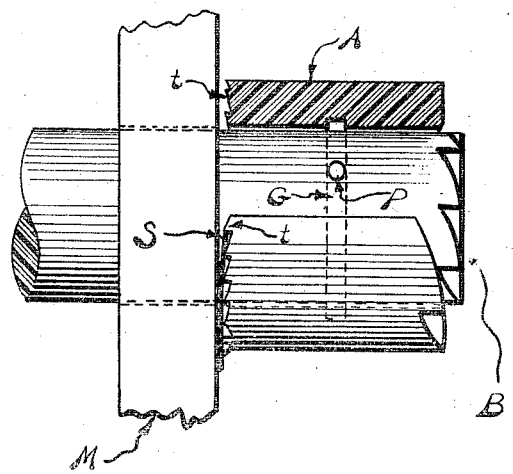
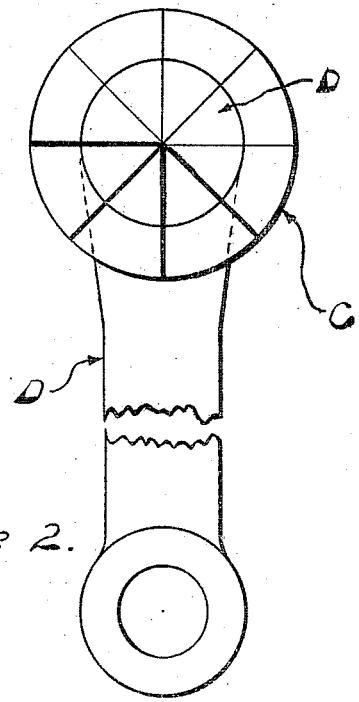
Witnesses:
James F. Preston.
Thomas H. Howell
Frederic G. Preston Inventor

UNITED STATES PATENT OFFICE.

FREDERIC G. PRESTON, OF MALDEN, MASSACHUSETTS.

MECHANISM FOR CRANKING AUTOMOBILES AND TO PREVENT INJURY FROM BACK-FIRING OF ENGINES.

985,837.  Specification of Letters Patent.   Patented Mar. 7, 1911.

Application filed February 5, 1909. Serial No. 476,335.

*To all whom it may concern:*

Be it known that I, FREDERIC G. PRESTON, of Malden, in the county of Middlesex and State of Massachusetts, have invented certain new and useful Improvements in Mechanism for Cranking Automobiles and to Prevent Injury from Back-Firing of Engines, of which the following is a specification.

My invention consists of a contrate-wheel or crown-gear, wheel or toothed collar, Figure 1, A, fitted to turn loosely on the crankshaft or other shaft connecting therewith, said crown-gear or wheel being supplied with a fine ratchet or other device which will allow it to turn forward, but will prevent it from revolving backward, and having a suitable number of bevel teeth, of sufficient pitch and depth to force the hand-crank or key away from its engagement with the shaft B, Fig. 1, which it engages in "cranking" or imparting the initial compression and motion to a gasolene engine; by the engagement of said crown-gear with a corresponding crown-gear C having a corresponding number, pitch and depth of teeth attached to the "hand-crank" or key D, substantially as shown in the accompanying drawings. The object of my said invention being to throw off or disengage the hand-crank or key D from the shaft B or other direct or indirect connection with the crank shaft of the engine, in the process, or imparting the initial compression and motion to a gasolene engine in the event of "back-firing" or reversing of the engine, and preventing personal injury to the operator; it frequently happening that a gasolene engine particularly on an automobile, will suddenly, without warning "back-fire" or start with a motion opposite to the motion intended and expected and thereby break the bone of the wrist of the operator and some times throw him with great force and cause him more serious injury.

The invention further consists in the construction and arrangement of parts as will be hereinafter described and particularly pointed out in the claim.

In the accompanying drawings, Fig. 1, is a section of shaft bearing M, and the shaft B, with a section of the crown-gear or toothed-collar A upon it; held in place so as to prevent sliding longitudinally, by a pin P, which travels freely in an internal groove G cut in the bore of the crown-gear A, and allows the shaft to revolve within the crown-gear A. On the reverse end of the crown-gear A, are fine ratchet teeth t t engaged by a pawl S which prevents the crown-gear or toothed-collar A from revolving backward.

The shaft B see Fig. 1, is represented as usually made for application to automobiles with a crown-gear on its outer end to engage the hand-crank D when the crank-shaft of the engine is to be revolved by force of the hand-crank; the bevel teeth being intended to automatically disengage the hand-crank from the shaft, when the engine takes up the impulse and moves forward by its own force.

Fig. 2 shows the hand-crank D with the crown-gear or toothed-collar C attached.

Fig. 3 is a section across the toothed end of the crank D and crown-gear or toothed-collar C.

In the ordinary operation of "cranking," the hand-crank D is placed in contact with the end of the shaft B and the operator turning it around with a forward motion (as the clock hands go), revolves the crank-shaft of the engine, forcing the pistons in and out, compressing the gas within the engine cylinder and carrying the engine to the "sparking" point where it should take up the motion by its own force, and by means of the bevel teeth on the shaft sliding away and riding up on the ends of the teeth of the hand-crank D, throw the hand-crank out of engagement. With my invention applied, the same process is employed and in revolving the shaft by means of the hand-crank D, the crown-gear C being attached by friction or otherwise to the hand-crank, engages and revolves the loose crown-gear A upon the shaft B, but in the event of the engine "back-firing" or turning suddenly and unexpectedly backward the ratchet at the reverse end of A holds it from revolving backward and the crown-gear C slides backward and rides up over the ends of the bevel teeth and thereby forces the hand-crank D off, or disengages it from the shaft B, and thereby prevents personal injury to the operator.

The location of the pawl and ratchet upon the crown-gear A, is not material. It may be upon the periphery of the gear if more convenient, or a friction gear ratchet or any substitute that allows the crown-gear A to turn forward and prevents it from turning backward may be employed.

This can be used for any engine, motor or machine, when it is desired to disengage automatically any moving parts of machinery to avoid loss or damage.

Claim.

The combination with a shaft bearing having a toothed shaft mounted therein provided with teeth on its outer end, a toothed collar mounted on said shaft provided with an internal groove therein and ratchet teeth on opposite ends thereof, a pin on the shaft for engaging the groove and permitting rotation of the shaft within the collar, means for engaging the teeth on one end of the collar to prevent backward rotation, a hand-crank provided with teeth contacting with the teeth of the shaft, and a crown gear adapted to engage the teeth on the other end of said collar whereby the teeth of the hand-crank are adapted to be automatically disengaged from the teeth of the shaft upon a backward motion of the shaft.

In testimony whereof I have affixed my signature, in presence of two witnesses.

FREDERIC G. PRESTON.

Witnesses:
JAMES F. PRESTON,
THOMAS H. CROWELL.

Copies of this patent may be obtained for five cents each, by addressing the "Commissioner of Patents, Washington, D. C."